Patented Mar. 13, 1928.

1,662,514

UNITED STATES PATENT OFFICE.

RONALD SMITH HORSFALL, LESLIE GORDON LAWRIE, AND JAMES HILL, OF BLACKLEY, MANCHESTER, ENGLAND, ASSIGNORS TO BRITISH DYESTUFFS CORPORATION LIMITED, OF MANCHESTER, ENGLAND.

PROCESS FOR DYEING CELLULOSE ESTERS AND ETHERS.

No Drawing. Application filed March 2, 1927, Serial No. 172,195, and in Great Britain June 11, 1926.

We have found that new and valuable shades can be obtained by dyeing cellulose esters and ethers with azo dyestuffs prepared by diazotizing amino derivatives of aryl sulphonarylamides and coupling the diazo-bodies with unsulphonated arylamines. By "aryl" we understand a hydrocarbon radicle of the benzene or naphthalene series, including substitution products. The sulphonarylides are readily prepared by treating the acid chloride of a nitrosulphonic acid with an aromatic amino compound and subsequently reducing the product so obtained, or they may be prepared in any other convenient way. The dyestuffs are slightly soluble in water and their solubility is considerably increased in sodium carbonate solution. As examples of the way in which cellulose esters or ethers may be dyed by the use of these dyestuffs, we may quote the following, it being understood, however, that these examples in no wise limit the scope of the invention:—

Example 1.

One part of the dyestuff prepared by diazotizing $m$-amino-benzene-sulphonanilide and coupling it with $\alpha$-naphthylamine, is dissolved in the dyebath containing 1 part of soda ash and to the lukewarm mixture is then added 100 parts of acetyl cellulose. The dyebath is raised to a temperature of 80° C. during half an hour and the material dyed for a further half hour at that temperature. It is then washed and dried in the usual way. This process gives a beautiful orange shade.

Example 2.

One part of the dyestuff prepared by diazotizing $m$-amino-benzene-sulphon-$m$-nitranilide and coupling it with "cresidine" ($m$-amino-p-cresol methyl ether), is used for preparing a dyeing according to the method of Example 1, and gives a very lustrous orange-red shade.

What we claim and desire to secure by Letters Patent is:—

1. The process of dyeing cellulose esters and ethers, comprising applying azo dyestuffs prepared by coupling diazotized amino-arylsulphonarylamides with unsulphonated arylamines to the cellulose derivative to be dyed in the presence of water.

2. The process of dyeing cellulose esters and ethers comprising applying the dyestuff prepared by coupling diazotized $m$-amino-benzene-sulphonanilide with $\alpha$-naphthylamine to acetyl cellulose in the presence of water.

3. The process of dyeing cellulose esters and ethers, comprising applying azo dyestuffs prepared by coupling diazotized amino-arylsulphonarylamides with unsulphonated arylamines to the cellulose derivative to be dyed in the presence of water containing sodium carbonate.

4. The process of dyeing cellulose esters and ethers comprising applying the dyestuff prepared by coupling diazotized $m$-amino-benzene-sulphonanilide with $\alpha$-naphthylamine to acetyl cellulose in the presence of water containing sodium carbonate.

5. Cellulose esters and ethers whenever dyed with azo dyestuffs prepared by coupling diazotized amino-arylsulphonarylamides with arylamines.

6. Cellulose esters and ethers whenever dyed with the azo dyestuff prepared by coupling diazotized $m$-amino-benzene-sulphonanilide with $\alpha$-naphthylamine.

In testimony whereof we affix our signatures.

RONALD SMITH HORSFALL.
LESLIE GORDON LAWRIE.
JAMES HILL.